(12) United States Patent
Kumula et al.

(10) Patent No.: US 8,694,172 B2
(45) Date of Patent: Apr. 8, 2014

(54) SYSTEMS AND DEVICES FOR CONTROLLING POWER GENERATION

(75) Inventors: Mario Joao Kumula, Sugar Land, TX (US); Roman Freidl, Spring, TX (US)

(73) Assignee: General Electric Company, Schenectady, NY (US)

( * ) Notice: Subject to any disclaimer, the term of this patent is extended or adjusted under 35 U.S.C. 154(b) by 265 days.

(21) Appl. No.: 13/180,897

(22) Filed: Jul. 12, 2011

(65) Prior Publication Data

US 2013/0015663 A1 Jan. 17, 2013

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)

(52) U.S. Cl.
USPC .......................................................... 700/287

(58) Field of Classification Search
USPC .......... 700/287, 292; 290/7, 40, 40 B, 43, 44, 290/52; 307/43
See application file for complete search history.

(56) References Cited

U.S. PATENT DOCUMENTS

| | | | |
|---|---|---|---|
| 4,455,614 A * | 6/1984 | Martz et al. | 700/288 |
| 6,118,187 A * | 9/2000 | Hepner et al. | 290/40 B |
| 8,237,301 B2 * | 8/2012 | Delmerico et al. | 290/44 |
| 2007/0290507 A1 | 12/2007 | Andrew et al. | |
| 2009/0194995 A1 * | 8/2009 | Delmerico et al. | 290/44 |
| 2011/0062708 A1 * | 3/2011 | Prochaska et al. | 290/7 |
| 2011/0126549 A1 * | 6/2011 | Pronske et al. | 60/783 |

\* cited by examiner

*Primary Examiner* — Mohammad Ali
*Assistant Examiner* — Ziaul Karim
(74) *Attorney, Agent, or Firm* — Fletcher Yoder P.C.

(57) ABSTRACT

Systems and devices for controlling power generation are provided. One system may include an electrical generator controller. The controller may include a filter component, a frequency response schedule component, and a rate limiter component. The filter component may receive a power grid frequency signal and output the frequency signal when the frequency signal is outside a frequency band. The frequency response schedule component may determine an ultimate target power contribution using the filtered frequency signal, the ultimate target power contribution representing an ultimate amount of power contribution that the electrical generator should provide in a primary frequency response. The rate limiter component may determine an immediate target power contribution signal that varies over time and approaches the ultimate target power contribution. Thus, the controller may control the approach rate and/or arrival time, and so forth, of the primary frequency response to a power grid frequency disturbance.

18 Claims, 5 Drawing Sheets

SYSTEMS AND DEVICES FOR CONTROLLING POWER GENERATION

BACKGROUND OF THE INVENTION

The subject matter disclosed herein relates generally to power generation units and, more particularly, to systems and devices for controlling electrical generators.

Power generation units generally provide alternating current to a power grid at a nominal frequency (e.g., 50 Hz or 60 Hz). At times, however, the power grid frequency may become disturbed and may vary from the nominal frequency. Such frequency disturbances may occur, for example, when power generation units are unexpectedly added or removed from a power grid, or when a load connected to the power grid is unexpectedly added or dropped. To maintain power grid stability, power generation units may respond to a frequency disturbance by increasing or decreasing power output accordingly. For example, if the change in power grid frequency passes a threshold known as a dead band frequency (e.g., a minimum frequency change), individual power generation units may perform a primary frequency response, increasing or decreasing the amount of power generated by each power generation unit proportionally to the change in frequency. Since different power generation units may have different capabilities and characteristics, some power generation units may rapidly change the output power in response to the frequency change, while other power generation units may respond more slowly. Further, while the ultimate target power contribution of a power generation unit for a frequency response may be controlled, the power delivery time, rate, and shape may be uncontrolled. In addition, to maintain the stability of the power grid, some grid operators may be regulated to provide a specific power output over time in response to a power grid frequency disturbance, which may preclude the use of power generating units that provide primary frequency responses that do not match the regulations.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, an electrical generator controller includes a filter component configured to receive a power grid frequency signal and to output the frequency signal when the frequency signal is outside a frequency band. The controller also includes a frequency response schedule component configured to determine an ultimate target power contribution based at least partly on the filtered frequency signal. The ultimate target power contribution represents an ultimate amount of power contribution that the electrical generator should provide in a primary frequency response. The controller includes a flexible rate limiter component configured to determine an immediate target power contribution signal that varies over time and approaches the ultimate target power contribution based at least in part on a rate-limiting schedule. The immediate target power contribution signal is configured to cause the electrical generator to increase or decrease a power output by the electrical generator by an amount corresponding to the immediate target power contribution signal.

In a second embodiment, a system includes a gas turbine configured to generate a torque and an electrical generator coupled to the gas turbine. The electrical generator is configured to provide power to a power grid based on the torque. The system also includes a controller associated with the gas turbine. The controller is configured to cause the gas turbine to vary the torque as a primary frequency response to a frequency signal on the power grid based at least in part on one of a plurality of immediate target power contribution signals. The controller includes one or more frequency filters configured to receive the frequency signal and to output the frequency signal when the frequency signal is outside a frequency band. The controller also includes one or more frequency response schedule components each configured to receive the frequency signal and output a respective ultimate target power contribution signal. Each of the ultimate target power contribution signals represents an ultimate amount of power contribution that the electrical generator should provide in a primary frequency response. The controller includes one or more rate limiter components each respectively configured to receive the respective ultimate target power contribution signals and determine one of the plurality of immediate target power contribution signals based at least in part on a rate-limiting schedule. Each of the plurality of immediate target power contribution signals is configured to cause the electrical generator to increase or decrease a power output by the electrical generator to a level indicated by that immediate target power contribution signal.

In a third embodiment, an article of manufacture includes one or more tangible, machine-readable media having encoded thereon processor-executable instructions. The instructions include instructions to receive a power grid frequency signal and instructions to determine when a frequency disturbance has occurred by determining when the power grid frequency signal is higher or lower than a dead band around a nominal frequency of the power grid. The instructions also include instructions to determine, when the frequency disturbance has occurred, an ultimate target power contribution based at least in part on a difference between the nominal frequency of the power grid and the power grid frequency signal. The ultimate target power contribution represents an ultimate amount of power contribution associated with a primary frequency response of an electrical generator to the frequency disturbance. The instructions include instructions to determine, when the frequency response has occurred, an immediate target power contribution signal based at least in part on the ultimate target power contribution and a time since the frequency disturbance occurred. The immediate target power contribution represents an immediate amount of power contribution associated with the primary frequency response of the electrical generator to the frequency disturbance. The instructions to determine the ultimate target power contribution or the immediate target power contribution, or both, are configured to vary based at least in part on a current time, a current date, the power grid frequency signal, a current output power of the electrical generator, operator preferences, an operating specification, or a rule or regulation associated with the power grid, or some combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to controlling an electrical generator in response to a change in a power grid frequency signal. In particular, the embodiments disclosed below may involve controlling the approach rate and/or arrival time of the electrical generator output power, rather than merely a target ultimate output power. These embodiments may involve controlling any suitable electrical generator. Some embodiments apply particularly to controlling the frequency response of low-inertia electrical generators, such as aero-derivative turbine generators, which may be relatively susceptible to frequency disturbances on the power grid, but which also may be capable of responding to such disturbances relatively rapidly. As used herein, the term "flexible frequency controller" will refer to a generator controller that can control the approach rate and/or arrival time of output power during a frequency response sequence.

When a frequency disturbance occurs on the power grid, causing the frequency of the power grid to vary from a nominal frequency (e.g., typically 50 Hz or 60 Hz), such a flexible frequency controller may cause an electrical generator to provide output power in a controlled way. Specifically, when the deviation from the nominal frequency exceeds a minimum threshold, known as a dead band, the flexible frequency controller may begin a primary frequency response in an attempt to stabilize the power grid. The primary frequency response may increase or decrease the output power of the electrical generator according to a controlled approach rate and/or arrival time. After the primary frequency response, a typically longer-lived secondary frequency response may involve sustaining a certain output power for a period of time while the power grid frequency stabilizes. This disclosure will focus on the primary frequency response.

In particular, a flexible frequency controller may control the primary frequency response of the electrical generator using a frequency response schedule, a rate-limiting schedule, and/or a power demand control-error. The frequency response schedule may specify an ultimate target power contribution depending on the amount of frequency deviation. This ultimate target power contribution represents the amount of total power contribution increase or decrease that the electrical generator should eventually provide in a primary frequency response. However, so that the electrical generator does not provide all of the power contribution right away, the electrical generator may not be controlled based on the ultimate target power contribution alone. Rather, having determined the ultimate target power contribution, the rate-limiting schedule then may be used to determine an immediate target power contribution based on the ultimate target power contribution and/or the amount of time since the frequency disturbance occurred. The immediate target power contribution may vary with time, eventually approaching the ultimate target power contribution. By controlling the electrical generator using the immediate target power contribution, over time, the electrical generator may generate and provide a power contribution with a controlled approach rate and/or arrival time.

In this way, using a frequency response schedule, a rate-limiting schedule, and/or a power demand control error, a flexible frequency controller can respond to a frequency disturbance in a manner that may improve the stability of the power grid. That is, to improve the stability of the power grid, a power grid operator may require that the frequency response be carried out in a specific manner. By way of example, a power grid operator may desire that all electrical generators operate during a frequency disturbance in a similar way to prevent, for example, a see-saw effect as power from a faster electrical generator backflows into a slower electrical generator. Specifically, a power grid operator may desire that an electrical generator provide increased or decreased power output at a particular rate over a certain time period. For example, in one embodiment, the desired change in power output may be represented by a frequency response schedule with a linear change, while the fastest rate of change possible by the electrical generator may be represented by an exponential change. Rather than merely allowing the electrical generator to respond at the fastest rate possible, the flexible frequency controller may control the rate that the electrical generator responds to a change in frequency.

Figure 1:
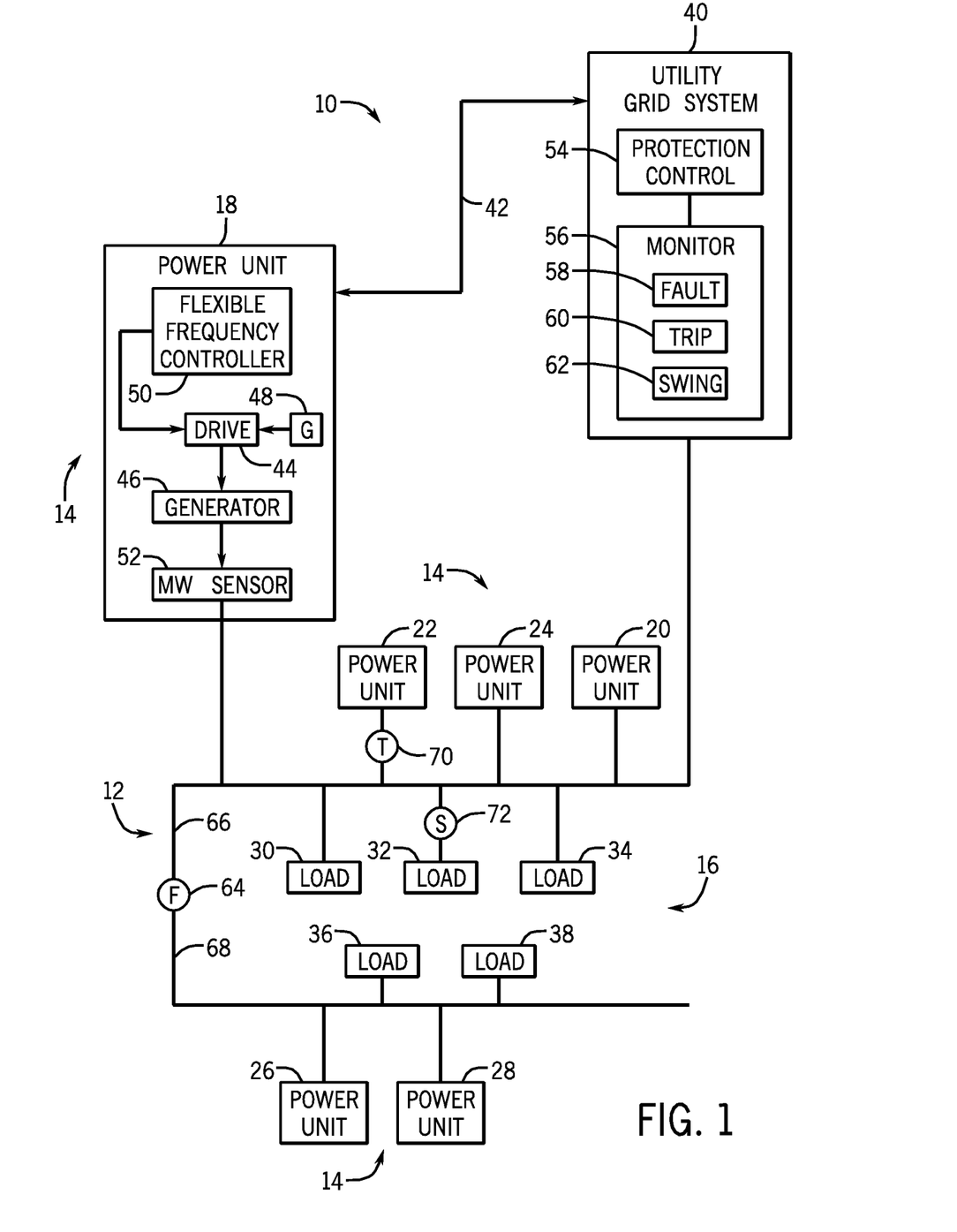
FIG. 1 is a block diagram of an embodiment of an electrical system in which a power generation unit may include a flexible frequency controller.

With the foregoing in mind, FIG. 1 is a block diagram of an embodiment of an electrical system 10, which includes a power grid 12 supplied by power units 14 which may be configured with flexible frequency controllers to respond to frequency-based disturbances of the power grid 12. As illustrated, the electrical system 10 includes the power grid 12 coupled to distributed power units 14 and distributed loads 16. The distributed power units 14 may include power units 18, 20, 22, 24, 26, and 28. Each of these distributed power units 14 is configured to generate power for distribution on the power grid 12. The distributed loads 16 may include loads 30, 32, 34, 36, and 38. Each of these distributed loads 16 is configured to draw power from the power grid 12 to operate machinery, buildings, and other systems.

The illustrated electrical system 10 also includes a utility grid system 40 coupled to the power grid 12. The utility grid system 40 may provide certain control over the power grid 12 and may detect various grid destabilizing events, such as transient stability upsets, in the power grid 12. These transient stability upsets may correspond to severe changes in frequency or loading on the power grid 12. Additionally, when such events occur, the utility grid system 40 may receive a utility signal 42 from one or more of the power units 14. The utility signal 42 may provide a utility operator with data, such as status and/or health data, relating to the power unit 14.

The distributed power units 14 may include a variety of power generation systems configured to distribute power onto the power grid 12. For example, such a distributed power unit 14 may include generators driven by a reciprocating combustion engine, a gas turbine engine, a steam turbine engine, a hydro-turbine, a wind turbine, and so forth. The size of these distributed power units 14 also may vary from one unit to another. For example, one power unit 14 may have a substantially larger inertia than another power unit 14 on the power grid 12. A power unit 14 with a large inertia may take more time to respond to a frequency change than a power unit 14 with a low inertia.

In the illustrated embodiment, the power unit 18 represents a relatively low inertia power unit 14, which includes a drive 44 coupled to a generator 46. The power unit 18 also includes a governor 48, which may provide a proportional-acting control of the drive 44. The drive 44 is configured to rotate the generator 46 for power generation in response to control by the governor 48 and/or other internal control features. In certain embodiments, the drive 44 may include a low rotating inertia engine, such as a gas turbine engine. For example, the drive 44 may include an aero-derivative gas turbine engine, such as an LM1600, LM2500, LM6000, or LMS100 aero-derivative gas turbine engine manufactured by General Electric Company of Schenectady, N.Y. However, the drive 44 may be any suitable mechanism for rotating the generator 46. As discussed in further detail below, the drive 44 may rapidly change in speed in response to a severe change in load on the power grid 12, thereby causing a rapid change in frequency of power output from the generator 46 onto the power grid 12.

The distributed loads 16 may include a variety of equipment and facilities on the power grid 12. For example, the distributed loads 16 may include residential homes, commercial buildings, industrial facilities, transportation systems, and individual equipment. In general, these distributed loads 16 may gradually change electrical demand over each 24 hour period. For example, peak demand may generally occur at midday, while minimum demand may generally occur at midnight. Over the course of the day, the electrical demand by these distributed loads 16 may generally increase in the morning hours, and subsequently decrease in the afternoon hours. The distributed power units 14 are generally able to respond to these gradual changes in electrical demand on the power grid 12. Unfortunately, rapid load swings on the power grid 12 may create a substantial gap between the electrical power supplied by the distributed power unit 16 and the electrical demand by the distributed loads 16. As a result, a large decrease in load may cause the power units 14 to accelerate, thereby increasing the frequency of the power grid 12. Likewise, a large increase in load may cause the power units to decelerate, thereby decreasing the frequency of the power grid 12.

As discussed in greater detail below, when such frequency-based grid disturbances occur, causing the frequency of the power grid 12 to deviate from a nominal frequency, the drive 44 may correspondingly increase or decrease in frequency. When such conditions involve frequencies that exceed a minimum threshold known as a dead band (e.g., 1 mHz, 2 mHz, 5 mHz, 10 mHz, 20 mHz, and so forth), a flexible frequency controller 50 may provide control signals, such as to the drive 44, intended to assist in stabilizing the power grid 12. Further, the flexible frequency controller 50 may provide signals to cause the drive 44 to add or remove torque to the generator 46 according to a frequency response schedule. Doing so may add or remove power that, collectively with other distributed power units 14, may return the frequency of the power grid 12 to its nominal frequency. In the illustrated embodiment, a megawatt sensor 52 in the power unit 18 is configured to monitor in real-time the megawatts produced by the generator 46 and provide the feedback to the flexible frequency controller 50.

Additionally, as illustrated, the utility grid system 40 may be configured to monitor certain system-wide events. For example, the utility grid system 40 may include a protection control 54 and a grid monitor 56, which collectively provide rapid event identification and corrective actions based on various grid destabilizing events throughout the power grid 12. For example, the grid monitor 56 may include a fault monitor 58, a trip monitor 60, and a swing monitor 62. The fault monitor 58 may be configured to rapidly identify a fault, such as a transmission line fault 64, in the power grid 12. The fault 64 may represent a discontinuity in first and second portions 66 and 68 of the power grid 12. As a result, the transmission line fault 64 may disconnect loads 36 and 38 and power units 26 and 28 from the first portion 66 of the power grid 12.

The trip monitor 60 may be configured to identify a trip of one or more of the distributed power units 14, such as a trip 70 of the power unit 22. As a result of the trip 70, the electrical power demand by the distributed loads 16 may suddenly exceed the available power provided by the distributed power units 14. The swing monitor 62 may be configured to identify rapid changes in electrical demand by one or more of the distributed loads 16, such as a swing 72 in the load 32. For example, the swing 72 may represent a sudden increase or decrease in electrical demand in certain equipment, industrial facilities, or the like.

Figure 2:
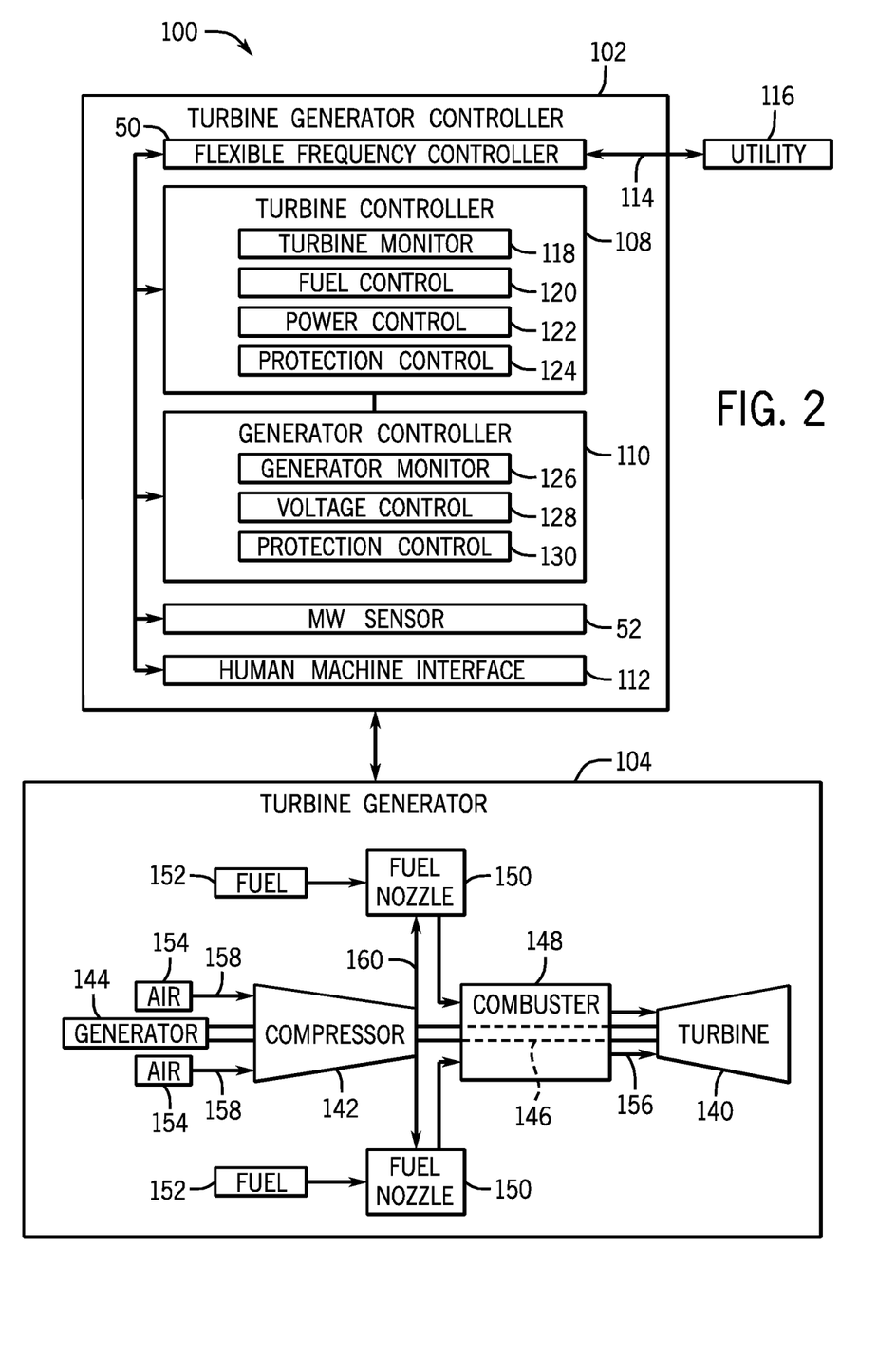
FIG. 2 is a block diagram of an embodiment of a turbine generator system including a flexible frequency controller.

FIG. 2 is a block diagram of an embodiment of a turbine generator system 100 having a turbine generator controller 102 coupled to a turbine generator 104. As illustrated, the turbine generated controller 102 includes the flexible frequency controller 50, a turbine controller 108, a generator controller 110, the megawatt sensor 52, and a human machine interface 112. As discussed in further detail below, the flexible frequency controller 50 may control the target power signals supplied to the turbine generator 104, such as by using one or more frequency response schedules. The turbine controller 108 may include a variety of monitors and controls, such as a turbine monitor 118, a fuel control 120, a power control 122, and a protection control 124. The illustrated generator controller 110 also may receive a utility signal 114 (e.g., the utility signal 42) from a utility 116 (e.g., the utility 40), and may include a variety of monitors and controls, such as a generator monitor 126, a voltage control 128, and a protection control 130. The monitors and controls of the turbine controller 108 and the generator controller 110 may be configured to monitor and control certain features of the turbine generator 104.

In the illustrated embodiment, the turbine generator 104 includes a turbine 140 coupled to a compressor 142 and an electrical generator 144 via one or more shafts 146. As appreciated, the illustrated turbine 140 may include one or more turbine stages, and the compressor 142 may include one or more compressor stages. The turbine generator 104 also includes one or more combustors 148 and fuel nozzles 150 configured to combust a mixture of fuel 152 and air 154, and deliver hot combustion gases 156 to the turbine 140. In particular, the compressor 142 is driven by the turbine 140 to compress air 154 at an upstream air intake 158, and then deliver compressed air 160 to the one or more combustors 148 and fuel nozzles 150. For example, the fuel nozzles 150 may transmit the compressed air 160 and the fuel 152 into the combustor 148 in a suitable mixture for combustion.

The mixture of fuel and air then combusts within the combustor 148, thereby producing hot combustion gases 156 flowing into the turbine 140. The hot combustion gases 156 drive turbine blades within the turbine 140 to rotate the shaft 146, thereby driving both the compressor 142 and the generator 144. In certain embodiments, the turbine engine may be an aero-derivative gas turbine engine, such as an LM1600, LM2500, LM6000, or LMS100 aero-derivative gas turbine engine manufactured by General Electric Company of Schenectady, N.Y. Thus, the turbine generator 104 may be configured to generate up to approximately 14 to 100 MW, 35 to 65 MW, or 40 to 50 MW of electricity. For example, the LM2500 engine may be configured to generate up to approximately 18 to 35 MW, the LM6000 engine may be configured to generate up to approximately 40 to 50 MW, and the LMS100 engine may be configured to generate up to approximately 100 MW.

The turbine generator controller 102 provides monitoring and control of various features of the turbine generator 104. For example, the turbine monitor 118 of the turbine controller 108 may monitor rotational speed, vibration, temperature, pressure, fluid flow, noise, and other parameters of the turbine 140, the compressor 142, the combustor 148, and so forth.

The fuel control 120 of the turbine controller 108 may be configured to increase or decrease fuel flow to the one or more fuel nozzles 150, thereby changing the combustion dynamics within the combustor 148 and in turn operation of the turbine 140. For example, the fuel control 120 may reduce the fuel flow rate to the fuel nozzles 150 to reduce the combustion in the combustor 148, and therefore reduce the speed of the turbine 140. Likewise, the fuel control 120 may increase the fuel flow rate to the fuel nozzles 140 to increase the combustion in the combustor 148, and therefore increase the speed of the turbine 140. The fuel control 120 also may vary other characteristics of the fuel injection depending on the number and configuration of fuel nozzles 150. For example, the fuel control 120 may adjust multiple independent fuel lines to different fuel nozzles 150 to vary the characteristics of combustion within the combustor 148. As illustrated in FIG. 2, blocks 152 may correspond to common or independent fuel lines, manifolds, or fuel governors. In response to a grid-destabilizing event, the flexible frequency controller 50 may control various aspects of the fuel control 120.

The power control 122 of the turbine controller 108 may be configured to increase or decrease power output of the turbine 140. For example, the power control 122 may monitor and/or control various operational parameters of the compressor 142, the fuel nozzles 150, the combustor 148, the turbine 140, and external loads (e.g., the generator 144). In particular, the power control 122 may cooperate with the fuel control 120 to adjust fuel flow, thereby adjusting combustion. The power control 122 also may control flow of multiple fuels (e.g., gas and/or liquid fuels), air, water, nitrogen, or various other fluids for various reasons, including performance, emissions, and so forth. For example, the power control 122 may selectively enable a gas fuel flow, a liquid fuel flow, or both depending on various conditions and available fuel. By further example, the power control 122 may selectively enable a low BTU fuel or a high BTU fuel depending on the power requirements. Likewise, the power control 122 may selectively enable water flow, nitrogen flow, or other flows to control emissions. In response to a frequency-based grid disturbance, the turbine generator controller 102 may control various aspects of the power control 122 to adjust power output as controlled by the flexible frequency controller 50.

The protection control 124 of the turbine controller 108 may execute corrective actions in response to events indicative of potential damage, excessive wear, or operational thresholds. For example, if the turbine monitor 118 identifies excessive vibration, noise, or other indicators of potential damage, the protection control 124 may reduce speed or shut down the turbine generator 104 to reduce the possibility of further damage. In certain embodiments, the protection control 124 of the turbine controller 108 may include clearance control, which may provide control of clearance between rotating and stationary components, e.g., in the turbine 140 and/or the compressor 142. For example, the clearance control may increase or decrease a coolant flow through the turbine 140 or the compressor 142 to change the thermal expansion or contraction of stationary parts, thereby expanding or contracting the stationary parts (e.g., shroud segments) about the rotating blades. In this manner, the clearance control may increase or decrease the clearance between the rotating blades and the stationary parts in the turbine 140 and the compressor 142. Alternatively, the clearance control may control other clearance mechanisms within the turbine 140 or the compressor 142, such as a drive mechanism coupled to the stationary parts disposed about the rotating blades within the turbine 140 or the compressor 142.

The generator controller 110 also may have a variety of monitor controls to improve performance and reliability of the power output from the turbine generator 104. For example, the generator monitor 126 may monitor the various power characteristics of the generator 144, such as voltage, current, and frequency. The generator monitor 126 also may monitor various characteristics indicative of wear or fatigue, such as vibration, noise, or winding faults. The voltage control 128 may be configured to process and filter the electrical output from the generator 144, thereby providing the desired electrical output to the power grid 12.

The protection control 130 may be configured to take corrective actions in response to feedback from the generator monitor 126, thereby reducing the possibility of fatigue or degradation to the generator 144 or the turbine generator 104 as a whole. For example, the protection control 130 may disconnect the generator 144 from the turbine generator 104, disconnect loads from the generator 144, or shut down the turbine generator 104 in response to excessive vibration or noise identified by the generator monitor 126.

Figure 3:
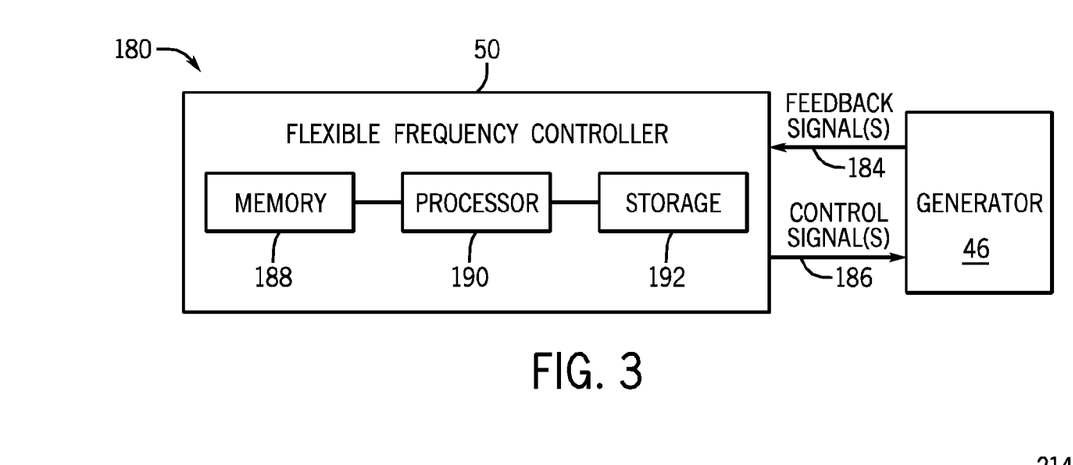
FIG. 3 is a schematic diagram of an embodiment of a flexible frequency controller.

A schematic 180 of an embodiment of the flexible frequency controller 50 that may control the primary frequency response of an electrical generator 46, such as the turbine generator 104, is depicted in FIG. 3. Although FIG. 3 schematically depicts the flexible frequency controller 50 as in communication with the electrical generator 46, it should be understood that the flexible frequency controller 50 may communicate with the electrical generator 46 through other components of the power generation unit 18 of which it is a part (e.g., the drive 44). As illustrated, the flexible frequency controller 50 receives feedback signal(s) 184 from the electrical generator 46, which may include a frequency of the power grid 12, among other things. Based at least partly on the feedback signal(s) 184, the flexible frequency controller 50 may determine control signal(s) 186 that cause the generator 46 to output power at a particular rate. By way of example, the control signal(s) 186 may include a power (MW) target contribution, a power (MW) demand control-error, and/or any other suitable representation of a desired increase in power.

As illustrated in FIG. 3, the flexible frequency controller 50 includes a memory 188, a processor 190, and storage 192. The memory 188 may include a volatile memory, such as random access memory (RAM), and/or a nonvolatile memory, such as read-only memory (ROM). The memory 188 may store processor-executable instructions (e.g., firmware or software) for the flexible frequency controller 50 to enable the flexible frequency controller 50 to carry out the techniques disclosed herein. The processor 190 may execute the instructions to control the flexible frequency controller 50. The processor 190 may include one or more microprocessors, such as one or more "general-purpose" microprocessors, one or more special-purpose microprocessors and/or ASICS, or some combination thereof. For example, the processor 190 may include one or more reduced instruction set (RISC) processors. The nonvolatile storage 192 of the flexible frequency controller 50 of the presently illustrated embodiment may include ROM, flash memory, a hard drive, or any other suitable optical, magnetic, or solid-state storage medium, or a combination thereof. The storage 192 may store data files (e.g., frequency response schedules and/or rate-limiting schedules to control the approach rate and/or time of a primary frequency response), instructions (e.g., software or firmware to implement functions of the flexible frequency controller 50), and any other suitable data.

Figure 4:
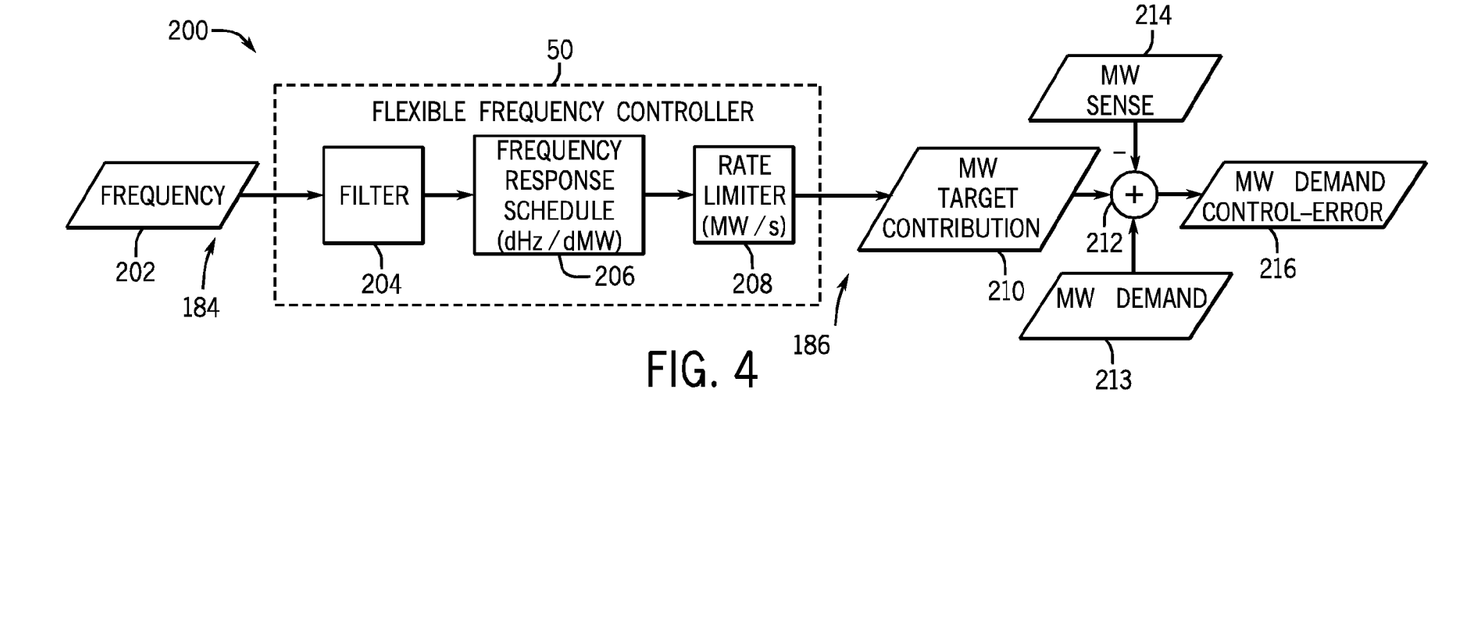
FIG. 4 is a flow diagram describing an embodiment of a control system used by the flexible frequency controller.

When a power grid 12 frequency disturbance occurs, the flexible frequency controller 50 may cause the electrical generator 46 to respond by increasing or decreasing its power output according to a frequency response schedule and/or rate-limiting schedule, as generally shown by a flow diagram 200 of FIG. 4. The flow diagram 200 illustrates an iterative process that can be repeated periodically (e.g., every 1 ms, 5 ms, 10 ms, 30 ms, 1 s, 5 s, 10 s, 30 s, 1 min., 5 min., 10 min., 30 min., 1 hr., and so forth, or whenever a frequency disturbance is deemed to have occurred) to control the power output of the electrical generator 46. As such, the flexible frequency controller 50 may receive a frequency signal 202, which may represent the feedback signal(s) 184 discussed above with reference to FIG. 3. The frequency signal 202 represents the frequency of the power grid 12 and, under normal operating conditions, should remain around a certain nominal value (e.g., typically 50 Hz or 60 Hz). Based at least partly on whether the frequency signal 202 indicates a power grid 12 frequency disturbance has occurred, and/or the extent to which a frequency disturbance has occurred, the flexible frequency controller 50 may cause the electrical generator 46 to carry out a primary frequency response. As will be discussed below, the flexible frequency controller 50 may control the primary frequency response to a frequency disturbance in a manner that controls not only the ultimate target power contribution, but also the approach rate and/or arrival time.

In particular, the flexible frequency controller 50 may carry out the process represented by the flow diagram FIG. 4 via a filter component 204, a frequency response schedule component 206, and a flexible rate limiter component 208 that collectively cause the power output by the electrical generator 46 during a primary frequency response to follow a particular pattern, rather than necessarily increasing or decreasing at the fastest possible rate. That is, the filter component 204, frequency response schedule component 206, and rate limiter component 208 may allow the electrical generator 46 to respond to frequency disturbances by simulating another electrical generator 46 of the same or different type, a brownout response, or an emergency response, for example. Furthermore, the filter component 204, the frequency response schedule component 206, and the rate limiter component 208 may be implemented in the flexible frequency controller 50 using hardware, processor-executable instructions, or a combination of hardware and processor-executable instructions. The filter component 204 may receive the frequency signal 202 and determine whether the frequency signal 202 is within or outside of a frequency band (e.g., a dead band). Thus, the filter component 204 may function as a dead band filter to block frequencies within a certain band of frequencies and only pass frequencies that are outside of the dead band. For example, the dead band frequency range may be approximately 60 Hz+/−10 mHz, 60 Hz+/−20 mHz, 60 Hz+/−25 mHz, or 60 Hz+/−30 mHz, or any other suitable dead band range. Therefore, if the dead band frequency range is approximately 60 Hz+/−20 mHz, any frequency within the range of 60 Hz+/−20 mHz will be blocked by the filter from continuing through the flexible frequency controller 50.

When the frequency signal 202 is not blocked by the filter component 204, the frequency response schedule component 206 correlates the frequency signal 202 with a response power signal. The frequency response schedule component 206 may include, for example, a lookup table or list that includes a response power signal corresponding to possible values of the frequency signal 202. The frequency response schedule component 206 may be formulated using a combination of variables specific to an electrical generator 46 and a utility grid 40 (e.g., max generator output, current generator output, percent contribution, etc.).

In addition, the frequency response schedule component 206 may be different in different embodiments of the flexible frequency controller 50. In certain embodiments, the frequency response schedule component 206 may linearly relate the frequency to a indicated ultimate target power contribution when the frequency is outside the dead band frequency range. For example, see FIG. 5 and its related description below, which includes a graphical representation of one manner in which the frequency response schedule component 206 may correlate frequency to an ultimate target power contribution. Further, specific frequency response schedules 206 may be used when particular conditions occur, such as brownout conditions. It should be noted that in certain embodiments, the flexible frequency controller 50 may include multiple frequency response schedule components 206.

Once the frequency response schedule component 206 determines the ultimate target output, the rate limiter component 208 limits the rate of change of the response power signal according to a rate-limiting schedule. As such, the rate limiter component 208 may operate according to a rate-limiting schedule (e.g., a rate table) that indicates a target power signal 210 based at least partly on the ultimate target power contribution from the frequency response schedule component 206 and an amount of time that has passed since the frequency disturbance was first detected. Additionally or alternatively, the rate-limiting schedule of the rate limiter component 208 may correlate the ultimate target power contribution as a percentage of a total available contribution power to a time schedule to produce the target power signal 210.

To provide a few examples, specific rate limiter components 208 that employ specific rate-limiting schedules may be used when particular conditions occur (e.g., brownout conditions) or to simulate the primary frequency response of a specific electrical generator 46 (e.g., another electrical generator 46 of the power grid 12). In certain embodiments, the flexible frequency controller 50 may include multiple rate limiter components 208 and/or the rate limiter component 208 may include multiple rate-limiting schedules.

As mentioned, above, the rate limiter component 208 outputs the immediate target power contribution 210. When the immediate target power contribution 210 and a megawatt demand 213, which represents the power demanded by the system, are added 212 to a megawatt sense 214 signal, which represents a current power output of the electrical generator 46, a megawatt demand control-error 216 signal results. This megawatt demand control-error 216 signal is used to control the power output of the electrical generator 46. Specifically, the megawatt demand control-error 216 signal represents an increase or decrease to the power output of the electrical generator 46.

As noted above, the actions of the flow diagram of FIG. 4 may repeat iteratively on a periodic basis. As such, at each iteration, even though the frequency signal 202 may remain the same and thus the ultimate target power contribution indicated by the frequency response schedule component 206 may remain the same, the rate limiter component 208 may output a different value of the immediate target power contribution 210 as time changes. In particular, as will be discussed below with reference to FIGS. 6 and 7, the rate limiter component 208 may output changing values of the immediate target power contribution 210 to cause the electrical generator 46 to generate a primary frequency response with a controlled approach rate and/or arrival time.

Figure 5:
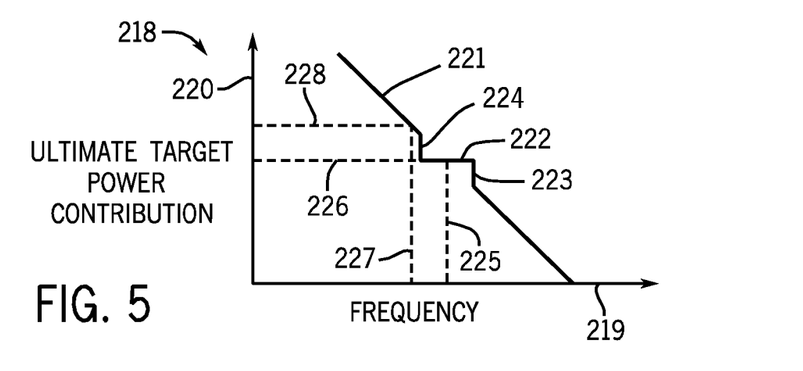
FIG. 5 is a diagram of an embodiment of a frequency response schedule of a flexible frequency controller.

FIG. 5 is a diagram of one example of a frequency response schedule 218 that can be used by the frequency response schedule component 206 of a flexible frequency controller 50 to determine an ultimate target power contribution value. In the frequency response schedule 218 of FIG. 5, the x-axis represents a grid frequency 219, while the y-axis represents an ultimate target power contribution 220. As such, a line 221 represents the ultimate target power contribution 220 that an electrical generator 46 may be controlled to provide depending on the grid frequency 219. The line 221 includes a generally horizontal region 222 bounded by generally vertical regions 223 and 224. Although the line 221 is depicted as being generally straight on both sides of the line 221 surrounding regions 222, 223, and 224, in certain embodiments the line 221 may be nonlinear.

The generally horizontal region 222 represents the power contribution 220 that is ordinarily indicated when the frequency 219 is within a frequency range between the regions 223 and 224 (e.g., within a dead band). Thus, within the dead band frequency range, the ultimate target power contribution 220 may be approximately 0 MW. That is, at an input grid frequency 225, corresponding to a frequency 219 equal to a nominal frequency of the power grid (e.g., 50 Hz or 60 Hz), an ultimate target power contribution 226 may be 0 MW. With an input grid frequency 227 that is outside the dead band frequency range, a corresponding ultimate target power contribution 228 may be less than or greater than 0 MW.

In other words, the frequency response schedule 218 of FIG. 5 represents the ultimate target power contribution to provide as droop contribution power when a frequency disturbance occurs. By way of example, the frequency response schedule 218 may represent the indicated ultimate target power contribution various frequencies, with the nominal frequency (e.g., 50 Hz or 60 Hz) indicated at numeral 225. The frequency response schedule 218 of FIG. 5 may indicate a maximum and minimum ultimate target power contribution to be reached at particular frequencies (e.g., ±2.5%, ±5%, ±10%, or ±16% of the nominal frequency 225). That is, a maximum ultimate target power contribution may be indicated (representing an increased amount of power to be output by the electrical generator 46) when the frequency of the power grid 12 has drooped by a certain value or percentage, and the minimum ultimate target power may be indicated (representing a decreased amount of power to be output by the electrical generator 46) when the frequency of the power grid has risen by the certain value or percentage.

To provide one example, when the total power output capability of the electrical generator 46 is 100 MW, for example, and the current nominal power output is 50 MW, the electrical generator 46 may have the ability to contribute an additional 50 MW if a frequency droop occurs. The frequency response schedule 218 may indicate the maximum ultimate target power contribution when, for example, a 5% frequency droop occurs. As such, the frequency response schedule 218 may indicate a maximum ultimate target power contribution of 50 MW (that is, an increase of 50 MW, or a total of 100 MW) when the frequency 219 droops by 5% or more. When the frequency droops some other amount 227 (e.g., by 1%), the frequency response schedule 218 may indicate an ultimate target power contribution 228 (e.g., ⅕ of the maximum, or an ultimate target power contribution of 10 MW). Similarly, when the frequency droops by 2%, the frequency response schedule 218 may indicate an ultimate target power contribution of 20 MW, and so forth. As should be appreciated, other embodiments of the frequency response schedule 218 may be linear or nonlinear.

Figure 6:
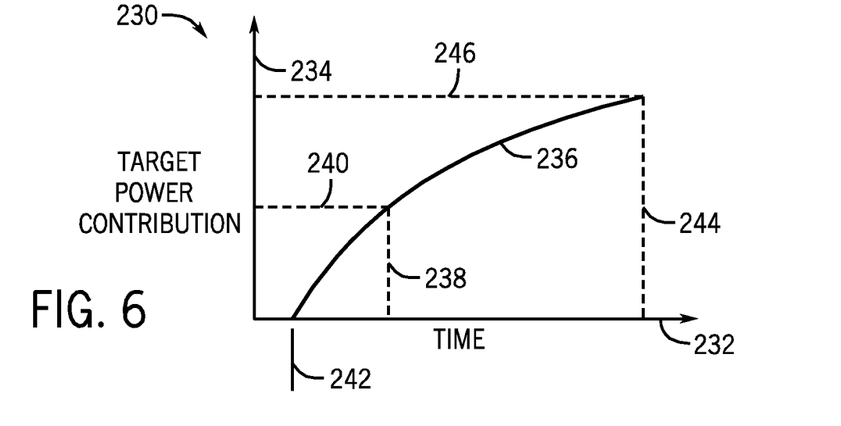
FIG. 6 is a diagram of an embodiment of a rate-limiting schedule of a flexible frequency controller.

An embodiment of a rate-limiting schedule 230 used by the rate limiter component 208 of the flexible frequency controller 50 appears in FIG. 6. The rate-limiting schedule 230 represents the immediate target power contribution 210 (that is, the amount of power contribution to be provided at a given moment so as to conform to a particular approach rate and/or arrival time) as a function of time and of the ultimate target power contribution determined by the frequency response schedule component 206. That is, based at least partly on the ultimate target power contribution from the frequency response schedule component 206, the rate-limiting schedule 230 may indicate the immediate target power contribution 210 as a function of time. In the rate-limiting schedule 230, a y-axis 234 represents the megawatt target contribution and an x-axis 232 represents time since the start of the last detected frequency disturbance. As such, a curve 236 correlates the immediate target power contribution 210 that is provided to the electrical generator 46 with time beginning at the start of the frequency disturbance. In the example of FIG. 6, the curve 236 increases relatively rapidly from a start time 242 and gradually approaches the ultimate target power contribution at an end time 244, beyond which point the immediate target power contribution 210 may be equal to the ultimate target power contribution for generally as long as the frequency disturbance endures. At a time 238, for example, the rate-limiting schedule 230 indicates an immediate target power contribution 210 of a maximum allowable power contribution 240. At the time 244, the rate-limiting schedule 230 indicates an immediate target power contribution 210 of a maximum allowable power contribution 246, which may be equal to the ultimate target power contribution.

Figure 7:
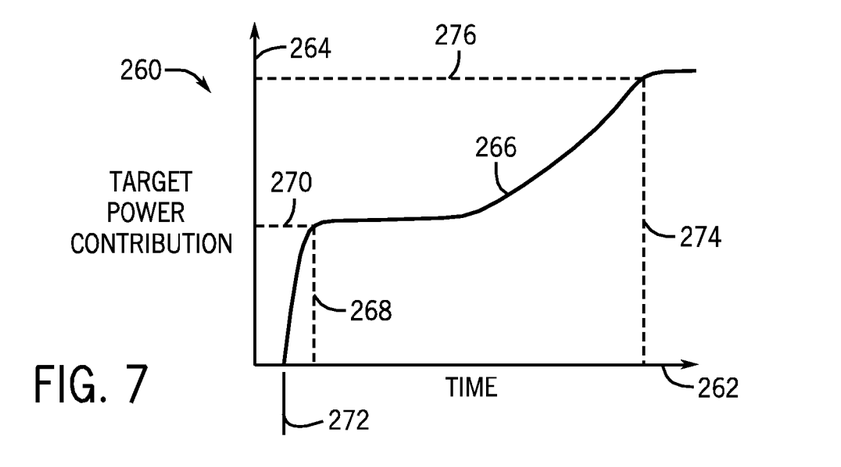
FIG. 7 is a diagram of another embodiment of a rate-limiting schedule of a flexible frequency controller.

The rate limiter component 208 may employ rate-limiting schedules of other functional forms with different shapes, approach rates, and/or arrival times. Indeed, as shown by FIG. 7, a rate-limiting schedule 260 may be used in an emergency response rate table to provide for an emergency response under emergency conditions. The rate-limiting schedule 260 may alternatively be used to cause the electrical generator 46 to imitate the primary frequency response of other electrical generators, such as steam generators. Like the rate-limiting schedule 230, the rate-limiting schedule 260 represents the immediate target power contribution 210 output by the rate limiter component 208 as a function of time and of the ultimate target power contribution determined by the frequency response schedule component 206. That is, based at least partly on the ultimate target power contribution from the frequency response schedule component 206, the rate-limiting schedule 230 may indicate the immediate target power contribution 210 as a function of time.

In the rate-limiting schedule, a y-axis 264 represents the megawatt target and an x-axis 262 represents time since the start of the frequency disturbance. As such, a curve 266 correlates the immediate target power contribution 210 that is provided to the electrical generator 46 with time beginning at the start of the frequency disturbance. In the example of FIG. 7, the curve 266 generally follows the same pattern of power output as typically carried out by steam generators during a primary frequency response. As should be appreciated, however, the curve 266 may alternatively have other shapes, approach rates, and/or arrival times. As can be seen in FIG. 7, the curve 266 increases according to a particular function from a start time 272 until reaching the ultimate target power contribution at an end time 274, beyond which point the immediate target power contribution 210 may be equal to the ultimate target power contribution for generally as long as the frequency disturbance endures. At a time 268, for example, the rate-limiting schedule 260 indicates an immediate target power contribution 210 of a maximum allowable power contribution 270. At the time 274, the rate-limiting schedule 260 indicates an immediate target power contribution 210 of a maximum allowable power contribution 276, which may be equal to the ultimate target power contribution.

Still other examples of rate-limiting schedules that may be used by the rate limiter component 208 may follow other patterns and/or functions. In particular, in at least one embodiment of a rate-limiting schedule, the immediate target power contribution 210 may increase toward the ultimate target power contribution over time in a linear manner, irrespective of the particular value of the ultimate target power contribution. Such a rate-limiting schedule may indicate an immediate target power contribution 210 with a constant slope (MW/s) regardless of the ultimate target power contribution determined by the frequency response schedule component 206. Other embodiments may have a slope (MW/s) that varies depending on the ultimate target power contribution.

Figure 8:
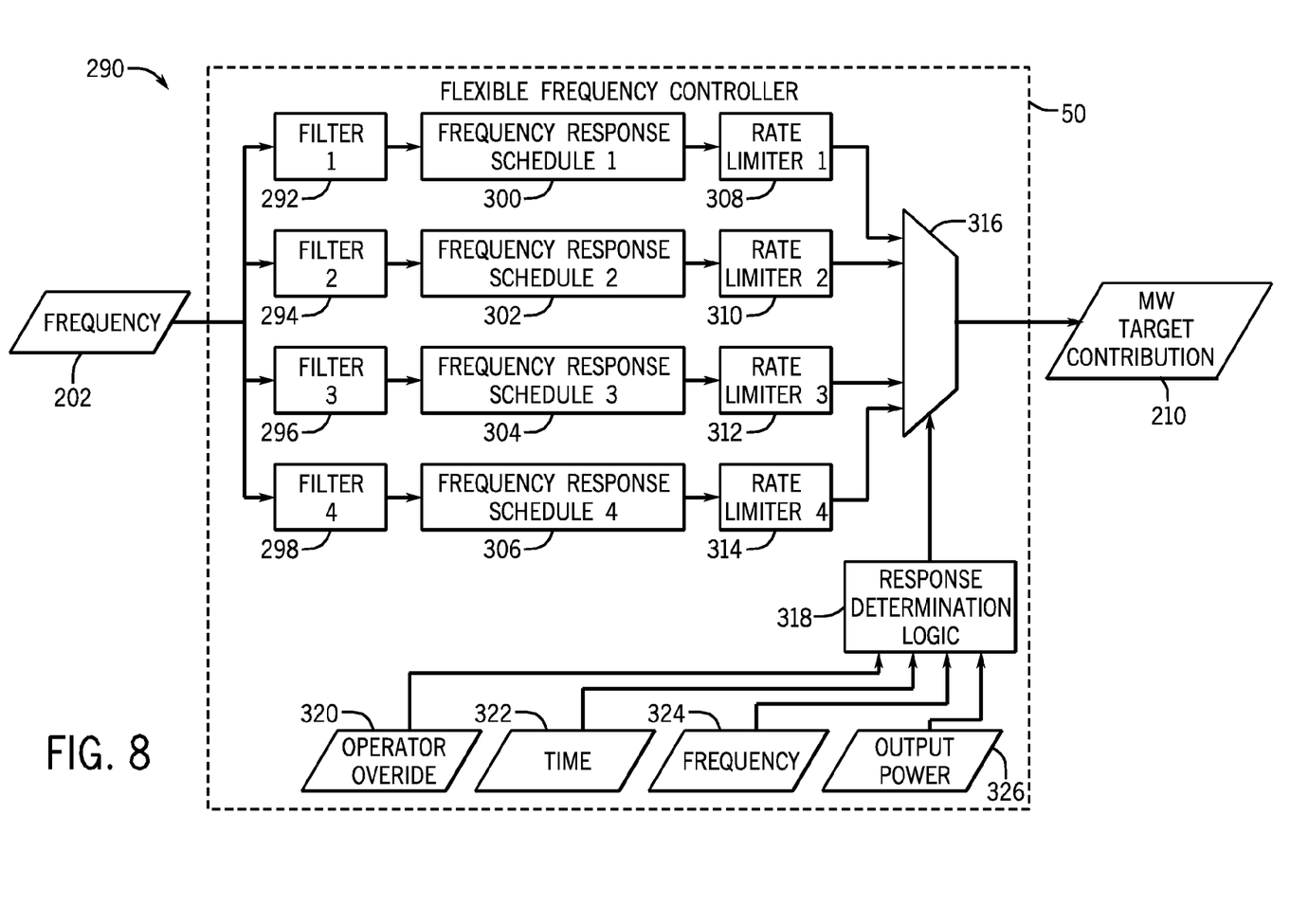
FIG. 8 is a flow diagram of another embodiment of a control system used by a flexible frequency controller.

A flexible frequency controller 50 may be capable of providing a variety of different primary frequency responses that can be used under various circumstances. FIG. 8, for example, represents an alternative flow diagram 290 by which the flexible frequency controller 50 may provide at least four different primary frequency responses. It should be appreciated that other embodiments may provide more or fewer primary frequency responses. Like the flow diagram 200 of FIG. 4, the flow diagram 290 represents an iterative process that the flexible frequency controller 50 may repeat periodically (e.g., every 1 ms, 5 ms, 10 ms, 30 ms, 1 s, 5 s, 10 s, 30 s, 1 min., 5 min., 10 min., 30 min., 1 hr., and so forth, or whenever a frequency disturbance is deemed to have occurred) to control the power output of the electrical generator 46. The various components of the flow diagram 290 may be implemented in the flexible frequency controller 50 using hardware, processor-executable instructions, or a combination of hardware and processor-executable instructions.

As can be seen in FIG. 8, the flow diagram 290 includes filter components 292, 294, 296, and 298, frequency response schedule components 300, 302, 304, and 306, and rate limiter components 308, 310, 312, and 314 that respectively cause the power output by the electrical generator 46 to follow particular primary frequency response patterns, rather than necessarily merely increasing or decreasing at the fastest possible rate. That is, the filter components 292, 294, 296, and 298, frequency response schedule components 300, 302, 304, and 306, and rate limiter components 308, 310, 312, and 314 may respectively function in generally the same manner as the filter component 204, the frequency response schedule component 206, and the rate limiter component 208 of FIG. 4, except that they may employ the same or different respective dead bands, frequency response schedules, and/or rate-limiting schedules.

As such, the rate limiter components 308, 310, 312, and 314 may provide different immediate target power contribution 210 signals to a multiplexer 316. Response determination logic 318 may select via the multiplexer 316 target megawatt contribution signal 210 that is ultimately output by the flexible frequency controller 50 based on any suitable number of factors. For example, the response determination logic 318 may determine which immediate target power contribution 210 to select based at least partly on an operator override 320, a time 322, a frequency 324, or an output power 326, for example. Any other suitable factors may be used.

The operator override 320 factor may indicate when an operator desires to select a particular filter component, frequency response schedule component, and rate limiter component. Such a selection may be determined based on an anticipated load on the power grid 12, a functional test, or some other reason determined by the operator. The time 322 may be used by the response determination logic 318 such that a different combination of filter component, frequency response schedule component, and rate limiter component may be applied during different times of the day or year (e.g., during peak energy use times compared to lower usage times). For example, one combination of filter component, frequency response schedule component, and rate limiter component may be used during the night, and another combination may be used during the day. Likewise, one combination of filter component, frequency response schedule component, and rate limiter component may be used during one season of the year, such as winter, while another combination is used during another season of the year, such as summer.

In addition, the frequency 324 on the grid may be used to determine which combination to use. For example, if the frequency 324 increases or decreases sharply, one combination of filter, frequency response schedule, and rate limiter may be used, while a gradual frequency change may use another combination. For example, when the frequency 324 falls beneath a threshold, brownout conditions may be present. As such, a filter component, frequency response schedule component, and rate limiter component appropriate for brownout conditions may provide the immediate target power contribution 210 signal. Likewise, the output power 326 of the electrical generator 46 may be used to determine a filter component, frequency response schedule component, and rate limiter component combination to use, which may be selected based at least partly on the amount of power contribution available from the electrical generator 46. For example, when the electrical generator 46 is producing power near its maximum capabilities, one combination may be used, while when the electrical generator 46 is near a minimum capability, another combination may be used. Furthermore, the combination used may depend on a load level, such as a base load (e.g., minimum load), an intermediate load (e.g., normal operating load), or a peak load (e.g., maximum load).

Technical effects of the present disclosure include the control of an electrical generator to provide a customized primary frequency response. For example, upon a power grid frequency disturbance, an electrical generator controller may determine an immediate target power contribution that increases at a steady rate (e.g., a linear or nonlinear rate) over time until reaching an ultimate target power contribution. The electrical generator controller thus may control the approach rate and/or arrival time of the primary frequency response, and therefore may cause the primary frequency response of the electrical generator to vary as desired. For example, the primary frequency response of the electrical generator may simulate another electrical generator, such as a steam generator, or may generally follow the same response pattern as another electrical generator present on the power grid.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A controller for an electrical generator comprising:
a filter component configured to receive a power grid frequency signal and to output the frequency signal when the frequency signal is outside a frequency band;
a frequency response schedule component configured to determine an ultimate target power contribution based at least partly on the filtered frequency signal, wherein the ultimate target power contribution represents an ultimate amount of power contribution that the electrical generator should provide in a primary frequency response; and
a flexible rate limiter component configured to determine and provide an immediate target power contribution signal that varies over time and approaches the ultimate target power contribution based at least in part on a rate-limiting schedule, wherein the immediate target power contribution signal is configured to cause the electrical generator to increase or decrease a power output by the electrical generator by an amount corresponding to the immediate target power contribution signal, wherein the rate-limiting schedule comprises a lookup table that correlates the immediate target power contribution signal and the ultimate target power contribution, and wherein the frequency response schedule component or the rate limiter component, or both, are configured such that the immediate target power contribution signal causes the electrical generator to behave as another generator.

2. The controller of claim 1, wherein the electrical generator comprises an aero-derivative turbine generator.

3. The controller of claim 1, wherein the filter component comprises a dead band filter configured to output the frequency signal when the frequency signal is outside of a dead band frequency range.

4. The controller of claim 1, wherein the frequency response schedule component or the rate limiter component, or both, are configured such that the immediate target power contribution signal causes the electrical generator to simulate a steam generator.

5. The controller of claim 1, comprising a summation device configured to add the immediate target power contribution signal to a megawatt demand signal and to subtract a megawatt sense signal to result in a megawatt demand control-error signal.

6. A system comprising: a gas turbine configured to generate a torque;
an electrical generator coupled to the gas turbine, wherein the electrical generator is configured to provide power to a power grid based on the torque; and
a controller associated with the gas turbine, wherein the controller is configured to cause the gas turbine to vary the torque as a primary frequency response to a frequency signal on the power grid based at least in part on one of a plurality of immediate target power contribution signals, the controller comprising:
one or more frequency filter components configured to receive the frequency signal and to output the frequency signal when the frequency signal is outside a frequency band;
one or more frequency response schedule components each configured to receive the frequency signal and output a respective ultimate target power contribution signal, wherein each ultimate target power contribution signal represents an ultimate amount of power contribution that the electrical generator should provide in a primary frequency response; and
one or more rate limiter components each configured to receive a respective ultimate target power contribution signal and determine one of the plurality of immediate target power contribution signals based at least in part on a rate-limiting schedule, wherein each of the plurality of immediate target power contribution signals is configured to cause the electrical generator to increase or decrease a power output by the electrical generator to a level indicated by that immediate target power contribution signal, wherein the rate-limiting schedule comprises a lookup table that correlates the immediate target power contribution signal and the ultimate target power contribution, and wherein the frequency response schedule component or the rate limiter component, or both, are configured such that the immediate target power contribution signal causes the electrical generator to behave as another generator.

7. The system of claim 6, wherein the controller comprises a selection component configured to enable user selection of the one of the plurality of immediate target power contribution signals upon which the primary frequency response of the electrical generator is based at least in part.

8. The system of claim 6, wherein the controller comprises a selection component configured to enable, via response determination logic, selection of the one of the plurality of immediate target power contribution signals upon which the primary frequency response of the electrical generator is based at least in part.

9. The system of claim 6, wherein at least one of the one or more rate-limiting schedules comprises an emergency response rate table.

10. The system of claim 6, wherein at least one of the one or more rate-limiting schedules is configured to simulate another primary frequency response of another electrical generator.

11. An article of manufacture comprising:
one or more tangible, non-transitory machine-readable media having encoded thereon processor-executable instructions, the instructions comprising: instructions to receive a power grid frequency signal; instructions to determine when a frequency disturbance has occurred by determining when the power grid frequency signal is higher or lower than a dead band around a nominal frequency of the power grid;

instructions to determine, when the frequency disturbance has occurred, an ultimate target power contribution based at least in part on a difference between the nominal frequency of the power grid and the power grid frequency signal, wherein the ultimate target power contribution represents an ultimate amount of power contribution associated with a primary frequency response of an electrical generator to the frequency disturbance; and instructions to determine, when the frequency response has occurred, an immediate target power contribution signal based at least in part on the ultimate target power contribution and a time since the frequency disturbance occurred, wherein the immediate target power contribution represents an immediate amount of power contribution associated with the primary frequency response of the electrical generator to the frequency disturbance, wherein the instructions to determine the immediate target contribution signal comprise instructions to use a lookup table that correlates the immediate target power contribution signal and the ultimate power contribution signal;

wherein the instructions to determine the ultimate target power contribution or the immediate target power contribution, or both, are configured to vary based at least in part on a current time, a current date, the power grid frequency signal, a current output power of the electrical generator, operator preferences, an operating specification, or a rule or regulation associated with the power grid, or some combination thereof.

12. The article of manufacture of claim 11, wherein the instructions to determine the ultimate target power contribution or the immediate target power contribution, or both, are configured to vary based at least in part on whether the frequency disturbance is determined to have occurred during the day or during the night.

13. The article of manufacture of claim 11, wherein the instructions to determine the ultimate target power contribution or the immediate target power contribution, or both, are configured to vary based at least in part on a season of the year.

14. The article of manufacture of claim 11, wherein the instructions to determine the ultimate target power contribution or the immediate target power contribution, or both, are configured to vary based at least in part on whether a brown-out scenario is expected to be occurring.

15. The article of manufacture of claim 11, wherein the instructions to determine the ultimate target power contribution or the immediate target power contribution, or both, are configured to vary based at least in part on an operator selection.

16. The article of manufacture of claim 11, wherein the instructions to determine the ultimate target power contribution or the immediate target power contribution, or both, are configured to vary based at least in part on an amount of power contribution available from the electrical generator.

17. The article of manufacture of claim 11, wherein the instructions to determine the ultimate target power contribution or the immediate target power contribution, or both, are configured to vary based at least in part on a current load level on the power grid.

18. The article of manufacture of claim 17, wherein the load level comprises a base load, an intermediate load, or a peak load.

* * * * *